United States Patent
Kaliner

(10) Patent No.: US 10,292,028 B2
(45) Date of Patent: May 14, 2019

(54) ENHANCED MACHINE TYPE COMMUNICATION BETWEEN MOBILE COMMUNICATION NETWORK AND GROUP OF MACHINE TYPE COMMUNICATION DEVICES

(71) Applicant: DEUTSCHE TELEKOM AG, Bonn (DE)

(72) Inventor: Stefan Kaliner, Koenigswinter (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/068,371

(22) PCT Filed: Jan. 5, 2017

(86) PCT No.: PCT/EP2017/050228
§ 371 (c)(1),
(2) Date: Jul. 6, 2018

(87) PCT Pub. No.: WO2017/118709
PCT Pub. Date: Jul. 13, 2017

(65) Prior Publication Data
US 2019/0028869 A1    Jan. 24, 2019

(30) Foreign Application Priority Data

Jan. 8, 2016 (EP) .................... 16150618

(51) Int. Cl.
*H04W 4/70* (2018.01)
*H04L 29/12* (2006.01)
*H04W 8/04* (2009.01)

(52) U.S. Cl.
CPC ........... *H04W 4/70* (2018.02); *H04L 61/6054* (2013.01); *H04W 8/04* (2013.01)

(58) Field of Classification Search
CPC ............... H04W 4/70; H04W 12/0806; H04W 12/1206; H04W 12/0215
See application file for complete search history.

(56) References Cited

U.S. PATENT DOCUMENTS

| | | |
|---|---|---|
| 2004/0047332 A1 | 3/2004 | Bensimon et al. |
| 2011/0161503 A1 | 6/2011 | Krebs |
| | | (Continued) |

FOREIGN PATENT DOCUMENTS

| | | |
|---|---|---|
| DE | 102008037725 A1 | 2/2010 |
| EP | 2624610 A1 | 8/2013 |
| | (Continued) | |

OTHER PUBLICATIONS

Interdigital Communication Corporation: "3GPP TSG SA WG2 Meeting #78, S2-101098, Addressing for NIMTC", 3GPP DRAFT; S2-101098_S2_78_TD_ADDRESSING for NIMTC, 3rd Generation Partnership Project (3GPP), Mobile Competence Centre; vol. SA WG2, No.; Feb. 22, 2010, Feb. 13, 2010 (Feb. 13, 2010), XP050433605, the whole document.

(Continued)

*Primary Examiner* — Charles N Appiah
*Assistant Examiner* — Xiang Zhang
(74) *Attorney, Agent, or Firm* — Leydig, Voit & Mayer, LTD.

(57) ABSTRACT

A method for enhanced machine type communication between a mobile communication network, on the one hand, and a group of machine type communication devices, on the other hand, wherein a plurality of subscribers are related to the mobile communication network. The method includes providing, by at least one network node of the mobile communication network, a Home Location Register functionality and/or a Home Subscriber Server functionality for the plurality of subscribers. A subscriber identifier is related (Continued)

to each of the plurality of subscribers of the mobile communication network such that the identifier content of the subscriber identifier is different for different subscribers related to the mobile communication network. The group of machine type communication devices is related to the same subscriber related to the mobile communication network.

14 Claims, 1 Drawing Sheet

(56) References Cited

U.S. PATENT DOCUMENTS

| | | | | |
|---|---|---|---|---|
| 2011/0244907 | A1* | 10/2011 | Golaup | H04W 4/70 |
| | | | | 455/509 |
| 2012/0209978 | A1* | 8/2012 | Cho | H04W 60/04 |
| | | | | 709/223 |
| 2013/0155894 | A1* | 6/2013 | Li | H04W 74/0833 |
| | | | | 370/252 |
| 2013/0155948 | A1 | 6/2013 | Pinheiro et al. | |
| 2014/0274186 | A1* | 9/2014 | Cai | H04W 4/70 |
| | | | | 455/517 |

FOREIGN PATENT DOCUMENTS

| | | |
|---|---|---|
| EP | 2785085 A1 | 10/2014 |
| JP | 2015173512 | 10/2015 |

OTHER PUBLICATIONS

3GPP TSG SA Meeting #57, "Presentation of TR 23.77: System Improvements for Machine-Type Communications (Release 11)", Sep. 10-12, 2012, pp. 1-5.

\* cited by examiner

ENHANCED MACHINE TYPE COMMUNICATION BETWEEN MOBILE COMMUNICATION NETWORK AND GROUP OF MACHINE TYPE COMMUNICATION DEVICES

CROSS REFERENCE TO RELATED APPLICATIONS

This application is a U.S. National Stage Application under 35 U.S.C. § 371 of International Application No. PCT/EP2017/050228 filed on Jan. 5, 2017, and claims benefit to European Patent Application No. 16150618.3 filed on Jan. 8, 2016. The International Application was published in English on Jul. 13, 2017 as WO 2017/118709 A1 under PCT Article 21(2).

FIELD

The present invention relates to a method for enhanced machine type communication between a mobile communication network, on the one hand, and a group of machine type communication devices, on the other hand. The present invention furthermore relates to a mobile communication network for enhanced machine type communication between a mobile communication network, on the one hand, and a group of machine type communication devices, on the other hand. Additionally, the present invention relates to a machine type communication device of a group of machine type communication devices for enhanced machine type communication between a mobile communication network, on the one hand, and the group of machine type communication devices, on the other hand. Furthermore, the present invention relates to a user equipment for enhanced machine type communication between a mobile communication network, on the one hand, and a group of machine type communication devices, on the other hand.

BACKGROUND

Machine type communication is increasingly used in cellular access networks, as well as in information and telecommunications systems in general. Examples of systems using machine type communication devices for machine type communication operations may include: remotely controlled power meters as well as metering machine type communication devices, remotely controlled machine type communication devices for controlling functions e.g. in a home which make it possible to turn on an heating prior to arriving home.

In addition to such examples of stationary machine type communication, there are also applications of mobile machine type communication, such as remotely monitoring and/or controlling functions or status information in a car, boat, or some other kind of vehicle.

Due to the vast amount of possible applications for machine type communication, machine type communication devices and machine type communication systems, an important increase in signaling traffic and in data traffic in cellular access systems can be expected.

Release 10 of the Third Generation Partnership Project (3GPP Rel-10) refers to applications or scenarios of machine type communication (or machine to machine communication (M2M communication) scenarios) and typically defines a plurality of machine type communication devices which are controlled by a machine type communication server. The machine type communication server is a functional entity that is either part of the mobile communication network or which is located outside of the mobile communication network (belonging or operated by a machine to machine service provider) to which the machine type communication devices are connected or with which the machine type communication devices communicate.

A typical machine type communication device is connected through cellular access networks to mobile communication networks, the access networks including typically GSM (Global System of Mobile Communication) access networks, GPRS (General Packet Radio System) access networks, and/or EPS/LTE (Evolved Packet System/Long Term Evolution) access networks. The application in which a machine type communication device is used needs the machine type communication device to report data, or it may happen that the machine type communication server needs to transmit data to the machine type communication device.

Machine type communication devices typically do not need to continuously exchange data with the mobile communication network, i.e. either for a data transfer from the mobile communication network towards the machine type communication device or for a data transfer from the machine type communication device to the mobile communication network. In contrast, machine type communication devices typically make only sporadic use of the mobile communication network, i.e. such machine type communication devices are typically accessing the mobile communication network, e.g., once per hour and/or once per day or the like. Additionally, machine type communication devices are typically accessing the mobile communication network only for a short interval of time, such as typically only for a few seconds or a few minutes (typically less than 10 minutes).

Conventionally, a mobile communication network uses a Home Location Register functionality and/or a Home Subscriber Server functionality for its plurality of subscribers, typically in the form of a user database that supports other network entities of the mobile communication network in handling requests of the different user equipments. The user database or subscriber database typically comprises the subscription-related information (such, e.g., subscriber profiles), and performs authentication and authorization of the user or subscriber.

Conventional mobile communication networks typically use different subscriber identifiers for different user equipments, and also for different machine type communication devices, leading to comparably high costs.

SUMMARY

In an embodiment, the present invention provides a method for enhanced machine type communication between a mobile communication network, on the one hand, and a group of machine type communication devices, on the other hand, wherein a plurality of subscribers are related to the mobile communication network. The method includes providing, by at least one network node of the mobile communication network, a Home Location Register functionality and/or a Home Subscriber Server functionality for the plurality of subscribers. A subscriber identifier is related to each of the plurality of subscribers of the mobile communication network such that the identifier content of the subscriber identifier is different for different subscribers related to the mobile communication network. The group of machine type communication devices is related to the same subscriber related to the mobile communication network. The group of machine type communication devices comprises a maximum number of machine type communication devices, the maximum number of machine type communication devices being dependent on a predefined access duration and a predefined access frequency of the group of machine type communication devices such that, in case that a machine type communication device of the group of machine type communication devices accesses the mobile communication network, a likelihood of a collision with another machine type communication device of the same group of machine type communication devices also accessing the mobile communication network is equal to or lower than 10%.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
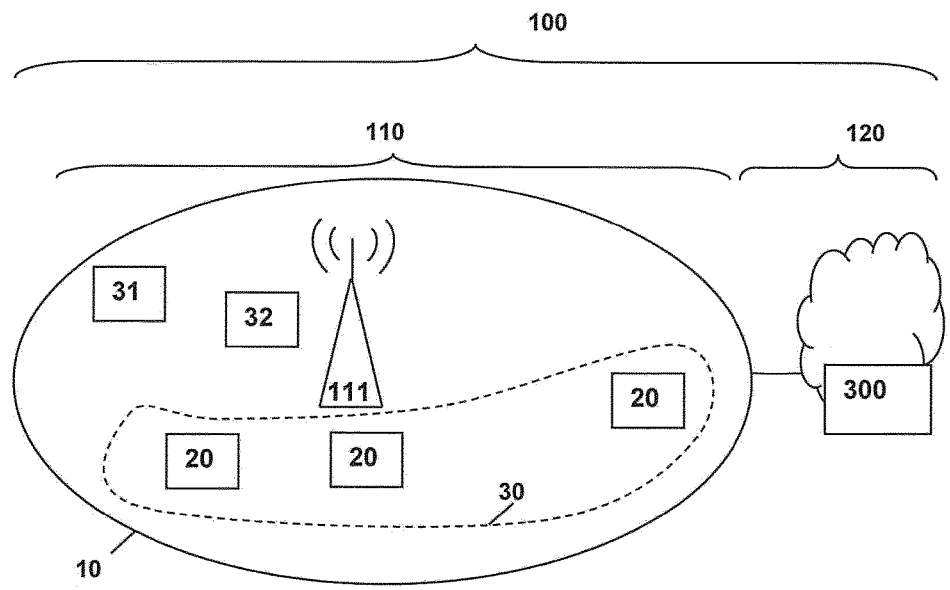
FIG. 1 schematically illustrates a mobile communication network that is enabled for enhanced machine type communication with a group of machine type communication devices sharing a common subscriber.

Embodiments of the present invention provide technically simple, effective and especially cost effective solutions for an enhanced machine type communication between a mobile communication network, on the one hand, and a group of machine type communication devices, on the other hand. Embodiments of the present invention provide mobile communication networks, machine type communication devices, and user equipments for an enhanced machine type communication between a mobile communication network, on the one hand, and a group of machine type communication devices, or user equipments, on the other hand, that allow for an efficient communication between the machine type communication and the mobile communication network in a more cost effective manner.

Embodiments of the invention provide methods for enhanced machine type communication between a mobile communication network, on the one hand, and a group of machine type communication devices, on the other hand, wherein a plurality of subscribers are related to the mobile communication network, wherein at least one network node of the mobile communication network provides a Home Location Register functionality and/or a Home Subscriber Server functionality for the plurality of subscribers, wherein a subscriber identifier is related to each of the plurality of subscribers of the mobile communication network such that the identifier content of the subscriber identifier is different for different subscribers related to the mobile communication network, wherein the group of machine type communication devices is related to the same subscriber related to the mobile communication network.

Embodiments of the present invention enable resources of the mobile communication network, especially regarding the network nodes providing the Home Location Register functionality and/or the Home Subscriber Server functionality, to be used in a more efficient manner, especially in order to provide machine type communication services by the mobile communication network. Embodiments of the invention enable a plurality of machine type communication devices to share a common subscriber, i.e. all the efforts (within the mobile communication network, e.g. in terms of database capacity, etc.) associated with that subscriber is only required once for a plurality of machine type communication devices or user equipments. Typically, all the machine type communication devices of such a group of machine type communication devices are associated to the same customer of the mobile communication network or operator of the mobile communication network.

Embodiments of the invention provide methods for enhanced machine type communication between a mobile communication network, on the one hand, and a group of machine type communication devices, on the other hand, wherein a plurality of subscribers are related to the mobile communication network, wherein at least one network node of the mobile communication network provides a Home Location Register functionality and/or a Home Subscriber Server functionality for the plurality of subscribers, wherein a subscriber identifier is related to each of the plurality of subscribers of the mobile communication network such that the identifier content of the subscriber identifier is different for different subscribers related to the mobile communication network, wherein the group of machine type communication devices is related to the same subscriber related to the mobile communication network, wherein the group of machine type communication devices comprises a maximum number of machine type communication devices, the maximum number of machine type communication devices being dependent on the predefined access duration and the predefined access frequency of the group of machine type communication devices such that, in case that a machine type communication device of the group of machine type communication devices accesses the mobile communication network, the likelihood of a collision with another machine type communication device of the same group of machine type communication devices also accessing the mobile communication network is equal to or lower than 10%.

Embodiments of the invention enable resources of the mobile communication network, especially regarding the network nodes providing the Home Location Register functionality and/or the Home Subscriber Server functionality, to be used in a more efficient manner, especially in order to provide machine type communication services by the mobile communication network. It is advantageously possible according to the present invention that a plurality of machine type communication devices share a common subscriber, i.e. all the efforts (within the mobile communication network, e.g. in terms of database capacity, etc.) associated with that subscriber is only required once for a plurality of machine type communication devices or user equipments. Typically, all the machine type communication devices of such a group of machine type communication devices are associated to the same customer of the mobile communication network or operator of the mobile communication network.

According to embodiments of the invention, the number of machine type communication devices in a group of machine type communication devices (i.e. having or sharing the same subscriber identifier) is chosen such that a tolerated collision rate of 10% is typically not exceeded.

In the context of the present invention, reference is made to machine type communication devices. Such machine type communication devices are typically used specifically for machine type communication purposes. However, each user equipment to be potentially used in a mobile communication network (such as ordinary mobile phones, smart phones, tablet computers or other mobile devices such as personal digital assistants or the like) can potentially be used for machine type communication purposes, e.g. to transmit a certain information, for example relating to a geographic position (in case that the mobile device comprises means to detect the geographic position of the mobile device by means of a receiver of a GNSS (global navigation satellite system) such as the GPS (global positioning system)) or relating to a temperature value or an acceleration value in case that the mobile device comprises (or is related to) an appropriate sensor device or sensor module. Therefore, the term machine type communication device also encompasses the case that the mobile device is a user equipment to be used in the mobile communication network, e.g. for voice communication and/or data communication purposes and is additionally—or alternatively—used as a machine type communication device. This means that in the context of the present invention, the term machine type communication device should also have the meaning of an arbitrary mobile device such as a user equipment, e.g. a smart phone, that is used according to a mode of operation such that—in that mode of operation—a plurality of such mobile devices or user equipments share one common subscriber entry of the database providing the Home Location Register functionality and/or the Home Subscriber Server functionality. Especially according to the present invention, it is possible that such a user equipment is able to be operated either in a first mode of operation or in a second mode of operation; in its second mode of operation, the user equipment is operated as a machine type communication device, i.e. using a subscriber that is shared among a plurality of machine type communication devices, and in the first mode of operation, the user equipment is operated as a conventional user equipment i.e. using a (different) subscriber which is typically not shared among a plurality of user equipments.

According to the present invention, a plurality of machine type communication devices, i.e. a group of machine type communication devices, are all related to one unique subscriber (i.e. the identifier content of the subscriber identifier of that subscriber is identical or, in other words, the subscriber (i.e. the identifier (content) identifying that subscriber) is shared among the machine type communication devices of the group of machine type communication devices).

According to a preferred embodiment of the present invention, the subscriber identifier corresponds to the International Mobile Subscriber Identity number (IMSI number) or the subscriber identifier corresponds to the Mobile Subscriber Integrated Services Digital Network Number (MSISDN number) or the subscriber identifier corresponds to a combination of the International Mobile Subscriber Identity number (IMSI number) and the Mobile Subscriber Integrated Services Digital Network Number (MSISDN number). It is thereby advantageously possible to assign the same identifier to the shared subscriber of the group of machine type communication devices, and to use typically used identifiers.

Furthermore, it is preferred according to the present invention that each machine type communication device of the group of machine type communication devices comprises an identity module, or an embedded identity module, or a soft subscriber identity module (soft SIM), having an identity module identifier and/or is related to an integrated circuit card identifier and/or comprises a serial number and/or is related to an identifier in the application running on the machine type communication device such that, by means of transmitting the identity module identifier and/or transmitting the integrated circuit card identifier and/or transmitting the serial number and/or transmitting the identifier in the application running on the machine type device, the transmitting machine type communication device of the group of machine type communication devices is able to be individually identified among the machine type communication devices of the group of machine type communication devices, especially by means of the International Mobile Equipment Identity (IMEI) and/or by means of the Integrated Circuit Card Identity (ICCID) and/or by means of the serial number and/or by means of the identifier in the application running on the machine type device.

It is thereby advantageously possible that the different machine type communication devices of the group of machine type communication devices are able to be differentiated—even though the machine type communication devices of this group of machine type communication devices share the same subscriber identifier—by means of the identity module identifier and/or the integrated circuit card identifier and/or the serial number and/or the identifier in the application running on the machine type device. According to an especially preferred embodiment, the different machine type communication devices of the group of machine type communication devices are able to be differentiated by means of the International Mobile Equipment Identity (IMEI) and/or by means of the Integrated Circuit Card Identity (ICCID). Instead of the ICCID, it is alternatively also possible that an arbitrary identifier is defined, e.g. on the SIM module and especially at the time of the production of the SIM module, or afterwards, which identifier could, e.g., be used only by the machine-type-communication-related application within the machine type communication device, thereby providing the possibility to distinguish different machine type communication devices of the group of machine type communication devices. In case a SIM module is used, and in order to avoid misuse or fraud by means of taking the SIM module out of the machine type communication device, it is advantageously possible according to the present invention that the SIM module is usable only after a cryptographically securitized authentication—e.g. between the machine type communication device, on the one hand, and the SIM module, on the other hand—is conducted.

Hence, it is advantageously possible according to the present invention that the members (i.e. the machine type communication devices) of the group of machine type communication devices (sharing the same subscriber identifier) are nevertheless distinguishable—not necessarily from the perspective of a network node providing the Home Location Register functionality and/or the Home Subscriber Server functionality, but at least from the point of view of a network node (of the mobile communication network) receiving a device identifier or device-related identifier from a given member of the group of machine type communication devices.

According to still a further preferred embodiment of the present invention, the machine type communication devices of the group of machine type communication devices are accessing the mobile communication network for a predefined access duration and with a predefined access frequency, wherein the predefined access duration and the predefined access frequency are the same for the group of machine type communication devices. The predefined access duration is especially a predefined average access duration or a predefined maximum access duration (regarding or of the group of machine type communication devices), and/or furthermore, the predefined access frequency is especially a predefined average access frequency or a predefined maximum access frequency (regarding or of the group of machine type communication devices).

Thereby, it is advantageously possible according to the present invention that the number of machine type communication devices in the group of machine type communication devices can be chosen in accordance to the predefined access duration and the predefined access frequency. This is especially advantageous in case that the machine type communication devices of the group of machine type communication devices are accessing the mobile communication network at arbitrary points in time. Especially in such a situation (i.e. that machine type communication devices are accessing the mobile communication network at arbitrary (or randomly chosen) points in time), machine type communication devices—used in a cellular mobile communication networks such as GPRS (General Packet Radio System), EDGE (Enhanced Data Rates for GSM Evolution), UMTS (Universal Mobile telecommunications System), HSDPA, HSUPA, or LTE (Long Term Evolution)—typically use a random access procedure (e.g. usage of the Random Access Channel (RACH)) to gain access to the mobile communication network. In addition to this, machine type communication devices may use the RACH (Random Access Channel) to transmit small amounts of data in UMTS. According to the standard procedure, user equipments in UMTS randomly choose a signature from a group of broadcast signatures and attempt to access the network in some predefined slots. That means that a shared resource is used for the machine type communication devices to access the mobile communication network and the number of machine type communication devices in the group of machine type communication devices can be adapted to the predefined access duration and the predefined access frequency.

In the context of the present invention, the term "predefined access duration" (of the devices in the considered group of machine type communication devices) relates—according to one variant of the present invention—to the single predefined access duration of all machine type communication devices in that group, especially in case that all such machine type communication devices (of that considered group) have the same (or almost the same) predefined access duration, i.e. the differences of the access durations of individual devices of that group of machine type communication devices is negligible compared to the (same) predefined access duration (e.g., the (same) predefined access duration would typically correspond to 115 seconds and the differences between the individual access durations corresponds to less than 1 or 2 seconds, i.e. the variation of the access duration within the group of machine type communication devices is less than a couple of percentage points, e.g. equal or lower than 1%, or equal or lower than 2%, or equal or lower than 3%, or equal or lower than 4%).

However according to other variants of the present invention, the term "predefined access duration" (of the devices in the considered group of machine type communication devices) can also relate to the "predefined average access duration" of all machine type communication devices in that group (i.e. the predefined access duration corresponds to the average of the access durations of the machine type communication devices in the considered group), or to the "predefined maximum access duration" of all machine type communication devices in that group (i.e. the predefined access duration corresponds to the maximum of all the typical access durations of the machine type communication devices in the considered group). In these other variants of the present invention, the access duration of the machine type communication devices is distributed, and might depend on the individual machine type communication device and/or on the current network load and/or local transmission conditions within the mobile communication network. This is why there is no single (or same) predefined access duration for each of the machine type communication devices of the considered group of machine type communication devices but the "predefined access duration" corresponds to characteristics of the distribution of the real (i.e. empirically measurable) access duration of the machine type communication devices.

Likewise in the context of the present invention, the term "predefined access frequency" (of the devices in the considered group of machine type communication devices) relates—according to another variant of the present invention—to the single predefined access frequency of all machine type communication devices in that group, especially in case that all such machine type communication devices (of that considered group) have the same (or almost the same) predefined access frequency, i.e. the differences of the access frequencies of individual devices of that group of machine type communication devices is negligible compared to the (same) predefined access frequency (e.g., the variation of the access frequency within the group of machine type communication devices is less than a couple of percentage points, e.g. equal or lower than 1%, or equal or lower than 2%, or equal or lower than 3%, or equal or lower than 4%).

However according to other variants of the present invention, the term "predefined access frequency" (of the devices in the considered group of machine type communication devices) can also relate to the "predefined average access frequency" of all machine type communication devices in that group (i.e. the predefined access duration corresponds to the average of the access durations of the machine type communication devices in the considered group), or to the "predefined maximum access frequency" of all machine type communication devices in that group (i.e. the predefined access duration corresponds to the maximum of all the typical access durations of the machine type communication devices in the considered group). In these other variants of the present invention, the access frequency of the machine type communication devices is distributed, and might depend on the individual machine type communication device and/or on the current network load and/or local transmission conditions within the mobile communication network. This is why there is no single (or same) predefined access frequency for each of the machine type communication devices of the considered group of machine type communication devices but the "predefined access frequency" corresponds to characteristics of the distribution of the real (i.e. empirically measurable) access frequencies of the machine type communication devices. According to the present invention, embodiments are possible and preferred where the predefined access duration in the sense of the same access duration for all machine type communication devices is combined with the predefined access frequency in the sense of the predefined average or maximum access frequency or vice versa.

According to the present invention, it is advantageously possible to use one single subscriber identifier (i.e. the identifier content of the subscriber identifier) for a certain number of machine type communication devices, this plurality of machine type communication devices forming a group of machine type communication devices (having the same subscriber identifier). This can, e.g., be realized by means of providing a certain number of SIM-cards with subscriber information such that the subscriber information (and especially also corresponding authentication parameters) relates to one single subscriber (identifier).

According to a first embodiment of the present invention, the machine type communication devices of the such defined group of machine type communication devices access the mobile communication network randomly or arbitrarily in time (i.e. the machine type communication devices of the group of machine type communication devices are accessing the mobile communication network at arbitrary points in time and/or for an arbitrary duration (i.e. during arbitrary time intervals)), which leads to the possibility of collisions or conflicts (in case that at least two machine type communication devices of the same group (i.e. having or using the same subscriber identifier) are trying to access the mobile communication network at least partly simultaneously).

Especially according to the first embodiment of the present invention, it is preferred that the group of machine type communication devices comprises a maximum number of machine type communication devices, the maximum number of machine type communication devices being dependent on the predefined access duration and the predefined access frequency of the group of machine type communication devices such that, in case that a machine type communication device of the group of machine type communication devices accesses the mobile communication network, the likelihood of a collision with another machine type communication device of the same group of machine type communication devices also accessing the mobile communication network is equal to or lower than 10%, preferably equal to or lower than 5%, more preferably equal to or lower than 1%; and most preferably equal to or lower than 0.2%.

Thereby, it is advantageously possible—especially in the context of the first embodiment of the present invention—that the number of machine type communication devices in a group of machine type communication devices (i.e. having or sharing the same subscriber identifier) is chosen such that a tolerated collision rate (of, e.g., 10% or 8% or 6% or 4% or 2% or 1% or less than 1%) is typically not exceeded.

Especially according to the first embodiment of the present invention, it is preferred that the group of machine type communication devices comprises a maximum number of machine type communication devices, the maximum number of machine type communication devices being dependent on the predefined access duration and the predefined access frequency of the group of machine type communication devices such that, in case that a machine type communication device of the group of machine type communication devices accesses the mobile communication network, the likelihood of a collision with another machine type communication device of the same group of machine type communication devices also accessing the mobile communication network is equal to or lower than 5%, preferably equal to or lower than 1%; and more preferably equal to or lower than 0.2%.

According to especially the first embodiment of the present invention, it is preferred that the tolerance for collision and/or conflict situations is enhanced by means of specific functions—typically within network nodes providing a Home Location Register and/or Home Subscriber Server functionality and/or within network nodes or a network node providing a Gateway GPRS (General Packet Radio Service) support node (GGSN)—that modify the location update process such that, in case of both a currently existing connection (between the mobile communication network and a first machine type communication device) and a different machine type communication device requesting such a connection to the mobile communication network, there is no interruption of the existing connection. Additionally and likewise according to especially the first embodiment of the present invention, it is preferred that the situation of a collision is assumed in case a machine type communication device receives specific network responses and the access of that machine type communication device to the mobile communication network could be delayed, e.g. by one unitary time slot or by an arbitrary number of time slots.

According to a second embodiment of the present invention, the machine type communication devices of the a group of machine type communication devices are not accessing the mobile communication network in a random manner (or arbitrarily) in time but at predefined points in time or at predefined time intervals at which or during which a machine type communication device is allowed to access the mobile communication network, hence avoiding, as much as possible, the likelihood of collisions or conflicts of a plurality of machine type communication devices of the same group (i.e. having or using the same subscriber identifier) accessing the mobile communication network at least partly simultaneously.

Especially according to the second embodiment of the present invention, it is preferred that each machine type communication device of the group of machine type communication devices comprises an access-time-related information, wherein the access-time-related information defines at least one predefined point in time or at least one predefined time interval at which or during which the considered machine type communication device is allowed to access the mobile communication network, the at least one predefined point in time and/or the at least one predefined time interval preferably corresponding to repeating points in time or repeating time intervals, wherein a data transmission event between, on the one hand, the mobile communication network, and, on the other hand, the machine type communication devices of the group of machine type communication devices, occurs at the predefined points in time or during the predefined time intervals, wherein preferably such data transmission events are initiated by the machine type communication devices of the group of machine type communication devices towards the mobile communication network.

Thereby, it is advantageously possible—especially in the context of the second embodiment of the present invention—that both the number of machine type communication devices that share the same subscriber identifier (for a given configuration of a predefined access duration and a predefined access frequency) can be increased, and the likelihood of collisions or conflicts of at least two machine type communication devices, having the same subscriber identifier and accessing the mobile communication network simultaneously, can be reduced.

Hence according to the present invention, especially with regard to the second embodiment, it is advantageously possible that by means of the machine type communication devices having an access-time-related information (for defining or indicating at least one predefined point in time or at least one predefined time interval at which or during which the considered machine type communication device is allowed to access the mobile communication network), the respective machine type communication device is able to self-determine when it can access the mobile communication network. This could generally be advantageous when accessing shared resources of the mobile communication network such as the random access resources of the mobile communication network, e.g., the RACH (random access channel), i.e. the access of other machine type communication devices also potentially requesting access to the random access resource is not impacted. Hence it is advantageously possible that (other parameters such as the predefined access duration and the predefined access frequency being equal) an increased number of machine type communication devices are able to share a subscriber identity, and a group of machine type communication devices can have an increased number of machine type communication devices.

According to the present invention, especially according to the second embodiment, it is advantageously possible that the machine type communication devices self-determine (by means of the access-time-related information) the time or the timeslot when to access the mobile communication network.

According to an embodiment of the present invention, it is possible and preferred that the time slot to be used by a certain machine type communication device results in adding a certain number of time slots (being specific for the considered machine type communication device) to a point in time common to the group of machine type communication devices sharing a subscriber identifier. The resulting effect is that there is a temporal spreading established of the points in time or the time slots used by the different machine type communication devices of the group of machine type communication devices.

One preferred possibility to assign a time slot to a specific machine type communication device (of the plurality of machine type communication devices within a group sharing the same subscriber identifier) is to apply a hash function operation or hash function, e.g., to the device identifier or device-related identifier in order to obtain a waiting time interval that is specific to the considered machine type communication device or to obtain a number of time slots to add to a point in time common to the group of machine type communication devices sharing a subscriber identifier. According to such a possibility, it is possible and preferred that the hash function corresponds to a modulo operation on the numerical value of the device-related identity information, e.g. provided that the numerical value of the device-related identity information corresponds to successive numerical values. According to further embodiments of the present invention, the point in time that is common to the group of machine type communication devices sharing a subscriber identifier is also called a base time, wherein the individual time a machine type communication device is accessing the mobile communication network preferably corresponds to the point in time corresponding to the sum of the base time and the (individual) waiting time interval (of the considered machine type communication device).

Thereby, it is advantageously possible according to the present invention that the machine type communication devices access the mobile communication network at a specific predetermined time, corresponding to the predetermined point in time, such that the access times of the different machine type communication devices within the group of machine type communication devices sharing a common subscriber identifier are different and hence a collision of access attempts is avoided as much as possible.

Furthermore, the present invention relates to a mobile communication network for enhanced machine type communication between a mobile communication network, on the one hand, and a group of machine type communication devices, on the other hand, wherein a plurality of subscribers are related to the mobile communication network, wherein at least one network node of the mobile communication network provides a Home Location Register functionality and/or a Home Subscriber Server functionality for the plurality of subscribers, wherein a subscriber identifier is related to each of the plurality of subscribers of the mobile communication network such that the identifier content of the subscriber identifier is different for different subscribers related to the mobile communication network, wherein the group of machine type communication devices is related to the same subscriber related to the mobile communication network.

Furthermore, the present invention also relates to a mobile communication network for enhanced machine type communication between a mobile communication network, on the one hand, and a group of machine type communication devices, on the other hand, wherein a plurality of subscribers are related to the mobile communication network, wherein at least one network node of the mobile communication network provides a Home Location Register functionality and/or a Home Subscriber Server functionality for the plurality of subscribers, wherein a subscriber identifier is related to each of the plurality of subscribers of the mobile communication network such that the identifier content of the subscriber identifier is different for different subscribers related to the mobile communication network, wherein the group of machine type communication devices is related to the same subscriber related to the mobile communication network, wherein the group of machine type communication devices comprises a maximum number of machine type communication devices, the maximum number of machine type communication devices being dependent on the predefined access duration and the predefined access frequency of the group of machine type communication devices such that, in case that a machine type communication device of the group of machine type communication devices accesses the mobile communication network, the likelihood of a collision with another machine type communication device of the same group of machine type communication devices also accessing the mobile communication network is equal to or lower than 10%.

Thereby, it is advantageously possible to use—within a mobile communication network—a group of machine type communication devices sharing one subscriber identifier, and, thus, reducing the operational costs per machine type communication device as resources of the mobile communication network, especially regarding the network nodes providing the Home Location Register functionality and/or the Home Subscriber Server functionality, can be used in a more efficient manner.

It is furthermore preferred according to the present invention—also with respect to the mobile communication network—that the subscriber identifier corresponds to the International Mobile Subscriber Identity number (IMSI number) or wherein the subscriber identifier corresponds to the Mobile Subscriber Integrated Services Digital Network Number (MSISDN number) or wherein the subscriber identifier corresponds to a combination of the International Mobile Subscriber Identity number (IMSI number) and the Mobile Subscriber Integrated Services Digital Network Number (MSISDN number), wherein especially each machine type communication device of the group of machine type communication devices comprises an identity module, or an embedded identity module, or a soft subscriber identity module (soft SIM), having an identity module identifier and/or is related to an integrated circuit card identifier and/or comprises a serial number and/or is related to an identifier in the application running on the machine type communication device such that, by means of transmitting the identity module identifier and/or transmitting the integrated circuit card identifier and/or transmitting the serial number, the transmitting machine type communication device of the group of machine type communication devices is able to be individually identified among the machine type communication devices of the group of machine type communication devices, especially by means of the International Mobile Equipment Identity (IMEI) and/or by means of the Integrated Circuit Card Identity (ICCID) and/or by means of the identifier in the application running on the machine type device.

It is thereby advantageously possible that the different machine type communication devices of the group of machine type communication devices are able to be differentiated—even though the machine type communication devices of this group of machine type communication devices share the same subscriber identifier—by means of the identity module identifier and/or the integrated circuit card identifier and/or the serial number and/or the identifier in the application running on the machine type device. According to an especially preferred embodiment, the different machine type communication devices of the group of machine type communication devices are able to be differentiated by means of the International Mobile Equipment Identity (IMEI) and/or by means of the Integrated Circuit Card Identity (ICCID) and/or by means of the identifier in the application running on the machine type device.

Furthermore, the present invention relates to a machine type communication device of a group of machine type communication devices for enhanced machine type communication between a mobile communication network, on the one hand, and the group of machine type communication devices, on the other hand, wherein a plurality of subscribers are related to the mobile communication network, wherein at least one network node of the mobile communication network provides a Home Location Register functionality and/or a Home Subscriber Server functionality for the plurality of subscribers, wherein a subscriber identifier is related to each of the plurality of subscribers of the mobile communication network such that the identifier content of the subscriber identifier is different for different subscribers related to the mobile communication network, wherein the group of machine type communication devices is related to the same subscriber related to the mobile communication network.

Furthermore, the present invention also relates to a machine type communication device of a group of machine type communication devices for enhanced machine type communication between a mobile communication network, on the one hand, and the group of machine type communication devices, on the other hand, wherein a plurality of subscribers are related to the mobile communication network, wherein at least one network node of the mobile communication network provides a Home Location Register functionality and/or a Home Subscriber Server functionality for the plurality of subscribers, wherein a subscriber identifier is related to each of the plurality of subscribers of the mobile communication network such that the identifier content of the subscriber identifier is different for different subscribers related to the mobile communication network, wherein the group of machine type communication devices is related to the same subscriber related to the mobile communication network, wherein the group of machine type communication devices comprises a maximum number of machine type communication devices, the maximum number of machine type communication devices being dependent on the predefined access duration and the predefined access frequency of the group of machine type communication devices such that, in case that a machine type communication device of the group of machine type communication devices accesses the mobile communication network, the likelihood of a collision with another machine type communication device of the same group of machine type communication devices also accessing the mobile communication network is equal to or lower than 10%.

It is furthermore preferred according to the present invention—also with respect to the machine type communication device—that the subscriber identifier corresponds to the International Mobile Subscriber Identity number (IMSI number) or wherein the subscriber identifier corresponds to the Mobile Subscriber Integrated Services Digital Network Number (MSISDN number) or wherein the subscriber identifier corresponds to a combination of the International Mobile Subscriber Identity number (IMSI number) and the Mobile Subscriber Integrated Services Digital Network Number (MSISDN number), wherein especially each machine type communication device of the group of machine type communication devices comprises an identity module, or an embedded identity module, or a soft subscriber identity module (soft SIM), having an identity module identifier and/or is related to an integrated circuit card identifier and/or comprises a serial number and/or is related to an identifier in the application running on the machine type communication device such that, by means of transmitting the identity module identifier and/or transmitting the integrated circuit card identifier and/or transmitting the serial number, the transmitting machine type communication device of the group of machine type communication devices is able to be individually identified among the machine type communication devices of the group of machine type communication devices, especially by means of the International Mobile Equipment Identity (IMEI) and/or by means of the Integrated Circuit Card Identity (ICCID) and/or by means of the identifier in the application running on the machine type device.

It is thereby advantageously possible according to the present invention that the members (i.e. the machine type communication devices) of the group of machine type communication devices (sharing the same subscriber identifier) are distinguishable, at least from the point of view of a network node (of the mobile communication network) receiving a device identifier or device-related identifier from a given member of the group of machine type communication devices.

Additionally, the present invention relates to a user equipment for enhanced machine type communication between a mobile communication network, on the one hand, and a group of machine type communication devices, on the other hand, wherein the user equipment is provided to be operated either in a first mode of operation or in a second mode of operation, wherein the second mode of operation corresponds to the use of the user equipment as a machine type communication device, wherein a plurality of subscribers are related to the mobile communication network, wherein at least one network node of the mobile communication network provides a Home Location Register functionality and/or a Home Subscriber Server functionality for the plurality of subscribers, wherein a subscriber identifier is related to each of the plurality of subscribers of the mobile communication network such that the identifier content of the subscriber identifier is different for different subscribers related to the mobile communication network, wherein the group of machine type communication devices is related to the same subscriber related to the mobile communication network, and wherein the user equipment in its first mode of operation corresponds to a different subscriber of the plurality of subscribers related to the mobile communication network.

Additionally, the present invention also relates to a user equipment for enhanced machine type communication between a mobile communication network, on the one hand, and a group of machine type communication devices, on the other hand, wherein the user equipment is provided to be operated either in a first mode of operation or in a second mode of operation, wherein the second mode of operation corresponds to the use of the user equipment as a machine type communication device, wherein a plurality of subscribers are related to the mobile communication network, wherein at least one network node of the mobile communication network provides a Home Location Register functionality and/or a Home Subscriber Server functionality for the plurality of subscribers, wherein a subscriber identifier is related to each of the plurality of subscribers of the mobile communication network such that the identifier content of the subscriber identifier is different for different subscribers related to the mobile communication network, wherein the group of machine type communication devices is related to the same subscriber related to the mobile communication network, and wherein the user equipment in its first mode of operation corresponds to a different subscriber of the plurality of subscribers related to the mobile communication network, wherein the group of machine type communication devices comprises a maximum number of machine type communication devices, the maximum number of machine type communication devices being dependent on the predefined access duration and the predefined access frequency of the group of machine type communication devices such that, in case that a machine type communication device of the group of machine type communication devices accesses the mobile communication network, the likelihood of a collision with another machine type communication device of the same group of machine type communication devices also accessing the mobile communication network is equal to or lower than 10%.

By means of operating the user equipment either in a first mode of operation or in a second mode of operation such that the second mode of operation corresponds to the use of the user equipment as a machine type communication device and the first mode of operation corresponds to a different subscriber (than the one shared by the machine type communication devices of the group of machine type communication devices) of the plurality of subscribers related to the mobile communication network, it is advantageously possible according to the present invention that an arbitrary user equipment (such as ordinary mobile phones, smart phones, tablet computers or other mobile devices such as personal digital assistants or the like) can be used, in the inventive mobile communication network, for machine type communication purposes, i.e. as a machine type communication device, e.g., to transmit a certain information, for example relating to a geographic position (in case that the mobile device comprises means to detect the geographic position of the mobile device by means of a receiver of a GNSS (global navigation satellite system) such as the GPS (global positioning system)) or relating to a temperature value or an acceleration value in case that the mobile device comprises an appropriate sensor device or sensor module. Likewise, it is advantageously possible according to the present invention to use a user equipment (such as ordinary mobile phones, smart phones, tablet computers or other mobile devices such as personal digital assistants or the like) as a machine type communication device (i.e. to operate the user equipment in the second mode of operation) for the purpose of accessing an identity module or an embedded identity module (such as, e.g. a Universal Integrated Circuit Card (UICC) or an embedded Universal Integrated Circuit Card (eUICC) or an integrated Universal Integrated Circuit Card (iUICC) or a Soft-UICC, e.g. using over-the-air (OTA) transmission) of the user equipment (used as machine type communication device), e.g. for the purpose of initially transmitting a SIM or USIM profile (e.g. of a mobile network operator MNO). In such a situation—especially in case of the use of an embedded UICC or integrated UICC or Soft-UICC in the user equipment—the embedded UICC or integrated UICC or Soft-UICC needs to comprise a provisioning SIM profile (i.e. the credentials for an initial access to a mobile communication network for the purpose of receiving an operational SIM profile) which is used while the user equipment is operated in the second mode of operation, in order to transmit the operational SIM or USIM profile (or other identity-module-related information or credentials such as relating to applets or profiles), which is typically used during the user equipment being operated in its first mode of operation.

Additionally, the present invention relates to the use of an inventive machine type communication device, or of an inventive user equipment in its second mode of operation as a machine type communication device.

Additionally, the present invention relates to a program comprising a computer readable program code which, when executed on a computer or on machine type communication device of the group of machine type communication devices or on a network component of a mobile communication network, causes the computer or the machine type communication device or the network component of the mobile communication network to perform an inventive method according to an embodiment of the invention.

Still additionally, the present invention relates to computer program products for enhanced machine type communication between a mobile communication network, on the one hand, and a group of machine type communication devices, on the other hand, the computer program product comprising a computer program stored on a storage medium, the computer program comprising program code which, when executed on a computer or on machine type communication device of the group of machine type communication devices or on a network component of the mobile communication network, causes the computer or the machine type communication device or the network component of the mobile communication network to perform the inventive method.

In FIG. 1, a mobile communication network 100, especially a public land mobile network 100, is schematically shown, the mobile communication network 100 comprising an access network 110 and a core network 120. The mobile communication network 100 is preferably a cellular telecommunications network comprising typically a plurality of network cells (or radio cells), one of which is represented in FIG. 1 by means of a solid line and reference sign 10. In the mobile communication network 100, typically a plurality of user equipments and/or machine type communication devices are camping on the telecommunications network 100 within the plurality of network cells or radio cells such as network cell 10 represented in FIG. 1, i.e. the user equipments and/or machine type communication devices are connected or are camping on a base station 111 serving radio cell 10. The base station 111 is typically a base station, e.g. BTS (base transceiver station), NodeB or an eNodeB base station.

The mobile communication network 100 generally serves a certain number of user equipments, each user equipment typically being assigned a certain subscriber. Typically within a conventional mobile communication network 100, a subscriber identifier is used, within the mobile communication network 100, to differentiate different subscribers, i.e. different devices—such as user equipments—accessing the mobile communication network 100. The subscriber identifier necessarily has a different identifier content (i.e. typically a different number composed of different numerical digits but potentially any alphanumerical string could be associated to the identifier content of a subscriber) for different subscribers 30, 31, 32. The typically different subscribers are designated by means of reference signs 30, 31, 32, and two such user equipments are schematically represented by means of reference signs 31 and 32 in FIG. 1.

According to the present invention, a plurality of machine type communication devices is schematically represented, bearing reference signs 20. Together, the machine type communication devices 20 form a group of machine type communication devices that is designated by reference sign 20, i.e. the machine type communication devices designated by means of reference sign 20 are part of the group of machine type communication devices 20. According to the present invention, all the machine type communication devices of the group 20 of machine type communication devices are sharing one common subscriber 30 (represented by a dashed line in FIG. 1)—i.e. a common subscriber that corresponds to the respective subscribers of the user equipments designated by means of reference signs 31 and 32 in FIG. 1—but, of course, the group of machine type communication devices 20 sharing the common subscriber 30 having a different identifier content of the subscriber identifier compared to the identifier content of the subscribers associated with the user equipments represented by means of reference signs 31 and 32.

The mobile communication network 100 comprises at least one network node 300 that provides a Home Location Register functionality and/or a Home Subscriber Server functionality for the plurality of subscribers 30, 31, 32. Within this at least one network node 300 (providing the Home Location Register functionality and/or the Home Subscriber Server functionality), the subscriber 30 is shared among the machine type communication devices of the group of machine type communication devices 20, i.e. only one subscriber identifier content is part of that network node 300 for the whole group of machine type communication devices. Typically within a mobile communication network 100, for each subscriber of the plurality of subscribers 30, 31, 32 of the mobile communication network 100, the network node 300 comprises a database entry (such as an individual International Mobile Subscriber Identity, IMSI) and a Mobile Station Integrated Services Digital Network, MSISDN number). Additionally, typically other nodes or functions of the mobile communication network 100 require a corresponding database entry for each subscriber of the plurality of subscribers 30, 31, 32 of the mobile communication network 100, such as nodes (of the mobile communication network) realizing a customer relationship management functionality. By means of sharing one subscriber 30 among the group of machine type communication devices 20, it is advantageously possible according to the present invention that all the efforts (within the mobile communication network 100, e.g. in terms of database capacity, etc.) associated with that shared subscriber 30 is only required once for the plurality of machine type communication devices or user equipments of the group of machine type communication devices 20.

According to the present invention, the subscriber identifier corresponds, e.g., to the International Mobile Subscriber Identity number (IMSI number) or the subscriber identifier corresponds to the Mobile Subscriber Integrated Services Digital Network Number (MSISDN number) or the subscriber identifier corresponds to a combination of the International Mobile Subscriber Identity number (IMSI number) and the Mobile Subscriber Integrated Services Digital Network Number (MSISDN number).

Furthermore, it is advantageously possible according to the present invention to nevertheless differentiate between the different machine type communication devices of the group of machine type communication devices 20—even though the machine type communication devices of this group of machine type communication devices 20 share the same subscriber identifier. This is advantageously possible, e.g., by means of each machine type communication device of the group of machine type communication devices 20 having an identity module identifier (of an identity module, or an embedded identity module, or a soft subscriber identity module (soft SIM)) and/or being related to an integrated circuit card identifier and/or comprising a serial number and/or being related to an identifier in an application running on the machine type communication device: By means of transmitting the identity module identifier and/or transmitting the integrated circuit card identifier and/or transmitting the serial number and/or transmitting the identifier in the application running on the machine type device, the transmitting machine type communication device of the group of machine type communication devices 20 can be individually identified among the machine type communication devices of the group of machine type communication devices 20.

According to a first embodiment of the present invention, the machine type communication devices of the group of machine type communication devices 20 access the mobile communication network 100 randomly or arbitrarily in time (i.e. the machine type communication devices of the group of machine type communication devices are accessing the mobile communication network at arbitrary points in time or during arbitrary time intervals), which leads to the possibility of collisions or conflicts (in case that at least two machine type communication devices of the same group (i.e. having or using the same subscriber identifier) are trying to access the mobile communication network at least partly simultaneously). In the context of the first embodiment of the present invention, the group of machine type communication devices 20 typically comprises a maximum number of machine type communication devices. This maximum number of machine type communication devices is typically dependent on the predefined access duration and the predefined access frequency of the group of machine type communication devices 20, especially in view of limiting the likelihood of a collision with another machine type communication device (of the same group of machine type communication devices 20) simultaneously accessing the mobile communication network 100. In case that the machine type communication devices are accessing the mobile communication network 100 (and not vice versa) arbitrarily in time, and in case that such access are, in average, relatively infrequent (with a frequency F) and, in average, of a relative limited duration (D), the likelihood P of a collision (i.e. of two machine type communication devices (of the same group of machine type communication devices 20) simultaneously accessing the mobile communication network 100) can be calculated to correspond to the difference of 1 and $e^{(-(k-1)*F*D)}$, i.e. $P=1-e^{(-(k-1)*F*D)}$, with k being the number of machine type communication devices sharing one subscriber 30. If this likelihood should—at least in a statistical average—not exceed 1% (i.e. P less than or at most equal to 0.01), the number k of machine type communication devices sharing one subscriber 30 could be equal to 4 if the predefined average access duration corresponds to 5 minutes and the machine type communication devices are accessing the mobile communication network 100 once every day. With the same assumption on the likelihood, and a predefined average access duration of 5 minutes but one access of the machine type communication devices per week, the number k of machine type communication devices sharing one subscriber 30 can be increased to 21, and under the same assumption regarding the likelihood, and predefined average access duration corresponding to 5 minutes but one access of the machine type communication devices per month, the number k of machine type communication devices sharing one subscriber 30 can be increased to 89. With the same assumption on the likelihood, and a predefined average access duration of only 1 minute, the number k of machine type communication devices sharing one subscriber 30 could be 15 in case of one access (of the machine type communication devices) per day, or could be 102 in case of one access per week, or could be 440 in case of one access per month.

It should be noted that according to the present invention—especially regarding the first embodiment of the present invention—, while the likelihood of collisions should be reasonably low, the event of a collision or a conflict (where two machine type communication devices of the same group of machine type communication devices 20 are accessing the mobile communication network 100 simultaneously) does typically not prevent the system to work properly, especially no negative effects are to be assumed on the side of the mobile communication network 100, especially in case that the operator of the mobile communication network 100 takes into account (e.g. within fraud and/or misuse prevention and/or accounting or charging systems) that such collision or conflict situations are possible to occur.

According to a second embodiment of the present invention, the machine type communication devices of the a group of machine type communication devices 20 are not accessing the mobile communication network in a random manner (or arbitrarily) in time but at predefined points in time or at predefined time intervals at which or during which a considered machine type communication device (of the group of machine type communication devices 20) is allowed to access the mobile communication network 100, hence avoiding, as much as possible, the likelihood of collisions or conflicts of a plurality of machine type communication devices of the same group 20 accessing the mobile communication network 100 at least partly simultaneously.

Especially according to the second embodiment of the present invention, it is preferred that each machine type communication device of the group of machine type communication devices comprises an access-time-related information, wherein the access-time-related information defines at least one predefined point in time or at least one predefined time interval at which or during which the considered machine type communication device is allowed to access the mobile communication network, or at least one predefined point in time and/or the at least one predefined time interval preferably corresponding to repeating points in time or repeating time intervals, wherein a data transmission event between, on the one hand, the mobile communication network 100, and, on the other hand, the machine type communication devices of the group of machine type communication devices 20, occurs at the predefined points in time or during the predefined time intervals, wherein preferably such data transmission events are initiated by the machine type communication devices of the group of machine type communication devices 20 towards the mobile communication network 100. Thereby, it is advantageously possible that the likelihood of collisions or conflicts can be reduced or even avoided at all. Furthermore according to the second embodiment of the present invention, it is possible that a communication event, i.e. the exchange of data between the machine type communication devices (of one group of machine type communication devices 20), on the one hand, and the mobile communication network 100, on the other hand, does not need to be triggered by the respective machine type communication device but could also be triggered by the mobile communication network 100. Under the assumption that a communication event or an exchange of data occurs regularly (or cyclically) with a frequency F and with a maximum duration D, there are—per such a cycle—$k=1/(F*D)$ different and independent time slots in order to operate at maximum k machine type communication devices (or user equipments) within the group of machine type communication devices 20, i.e. k being the number of machine type communication devices sharing one subscriber 30. This corresponds, e.g., to k=288 in case of one access (or communication event) per day and a maximum duration of 5 minutes, or to k=2016 in case of one access (or communication event) per week and a maximum duration of 5 minutes, or to k=8772 in case of one access (or communication event) per month and a maximum duration of 5 minutes, or to k=144 in case of one access (or communication event) per day and a maximum duration of 10 minutes, or to k=1008 in case of one access (or communication event) per week and a maximum duration of 10 minutes, or to k=4385 in case of one access (or communication event) per month and a maximum duration of 10 minutes. According to the present invention, it is not necessary to completely fill the maximum number of k machine type communication devices per group of machine type communication devices 20. Furthermore, it is possible according to especially the second embodiment of the present invention, that the individual access duration and/or the individual access frequency of a specific machine type communication device differs from the (typical or average) access duration and/or (typical or average) access frequency of the other machine type communication devices of that group of machine type communication devices 20, provided that the individual points in time (or time intervals) to access the mobile communication network 100 is appropriately defined for all the machine type communication devices (of that group 20) such that collisions and/or conflicts are avoided as much as possible.

According to the present invention, it is preferred that a common base time is defined for each group of machine type communication devices 20 for a specific predetermined period of time such that it is advantageously possible according to the present invention that the machine type communication devices access the mobile communication network once every day (e.g. at 11 am) (in case that the predetermined point in time is defined for a period of time of 24 hours, or once a week (in case that the predetermined point in time is defined for a period of time of seven days), or once every month (in case that the predetermined point in time is defined for a period of time of approximately thirty days or once every month). According to the present invention, the predetermined point in time (defined for a period of time) corresponds to a defined base time from which all the machine type communication devices of the group of machine type communication devices 20 will define their respective access time to access the mobile communication network 100, i.e. according to the present invention, only one machine type communication device of the group of machine type communication devices 20 is accessing the mobile communication network 100 at the base time and the other machine type communication devices of that group 20 will access the mobile communication network 100 at points in time spaced by a number of time slots as indicated by the access-time-related information.

Figure 2:
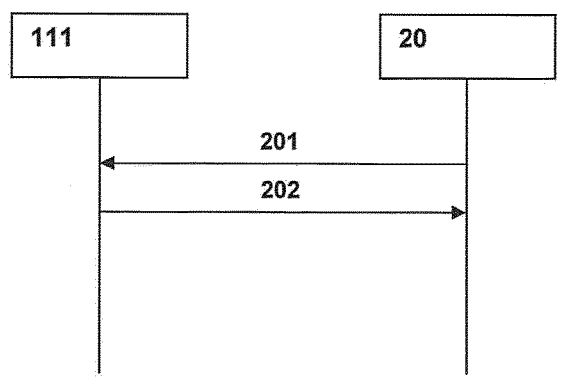
FIG. 2 schematically illustrates the general communication diagram between a base station of a mobile communication network and a machine type communication device of a group of machine type communication devices according to an embodiment of the present invention.

In FIG. 2, a communication diagram between the base station 111 (i.e. the mobile communication network 100) and the machine type communication device of the group of machine type communication devices 20 according to the present invention are schematically shown.

According to the present invention, in case that there is a need for the machine type communication device 20 to access the mobile communication network 100 (i.e. a need to access the base station 111 of radio cell 10), the machine type communication device 20 sends an access request, by means of a first message 201, to the base station 111 (i.e. to the mobile communication network 100) and receives an answer, by means of a second message 202, from the base station 111 (i.e. from the mobile communication network 100) to the machine type communication device 20.

It is to be understood that according to the present invention, that the mobile communication network 100 could comprise a plurality of different groups of machine type communication devices 20 (each comprising a plurality of machine type communication devices). However, for the sake of simplicity, in the context of the present description, only one such group of machine type communication devices 20 is addressed.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for enhanced machine type communication between a mobile communication network, on the one hand, and a group of machine type communication devices, on the other hand, wherein a plurality of subscribers are related to the mobile communication network, the method comprising:
   providing, by at least one network node of the mobile communication network, a Home Location Register functionality and/or a Home Subscriber Server functionality for the plurality of subscribers,
   wherein a subscriber identifier is related to each of the plurality of subscribers of the mobile communication network such that the identifier content of the subscriber identifier is different for different subscribers related to the mobile communication network,
   wherein the group of machine type communication devices is related to the same subscriber related to the mobile communication network, and
   wherein the group of machine type communication devices comprises a maximum number of machine type communication devices, the maximum number of machine type communication devices being dependent on a predefined access duration and a predefined access frequency of the group of machine type communication devices such that, in case that a machine type communication device of the group of machine type communication devices accesses the mobile communication network, a likelihood of a collision with another machine type communication device of the same group of machine type communication devices also accessing the mobile communication network is equal to or lower than 10%.

2. The method according to claim 1, wherein the subscriber identifier corresponds to the International Mobile Subscriber Identity number (IMSI number) or wherein the subscriber identifier corresponds to the Mobile Subscriber Integrated Services Digital Network Number (MSISDN number) or wherein the subscriber identifier corresponds to a combination of the International Mobile Subscriber Identity number (IMSI number) and the Mobile Subscriber Integrated Services Digital Network Number (MSISDN number).

3. The method according to claim 1, wherein each machine type communication device of the group of machine type communication devices:
   comprises an identity module, or an embedded identity module, or a soft subscriber identity module (soft SIM), having an identity module identifier, and/or
   is related to an integrated circuit card identifier, and/or
   comprises a serial number, and/or
   is related to an identifier in the application running on the machine type communication device,
   such that, by transmitting the identity module identifier and/or transmitting the integrated circuit card identifier and/or transmitting the serial number and/or transmitting the identifier in the application running on the machine type device, the transmitting machine type communication device of the group of machine type communication devices is able to be individually identified among the machine type communication devices of the group of machine type communication devices, by an International Mobile Equipment Identity (IMEI) and/or by an Integrated Circuit Card Identity (ICCID) and/or by the serial number and/or by the identifier in the application running on the machine type device.

4. The method according to claim 1, wherein the machine type communication devices of the group of machine type communication devices access the mobile communication network for a predefined access duration, which is a predefined average access duration or a predefined maximum access duration, and with a predefined access frequency, which is a predefined average access frequency or a predefined maximum access frequency, wherein the predefined access duration and the predefined access frequency are the same for the group of machine type communication devices.

5. The method according to claim 4, wherein the likelihood of a collision with another machine type communication device of the same group of machine type communication devices also accessing the mobile communication network is equal to or lower than 5%.

6. The method according to claim 1, wherein the machine type communication devices of the group of machine type communication devices access the mobile communication network at arbitrary points in time and/or for an arbitrary duration.

7. The method according to claim 1, wherein each machine type communication device of the group of machine type communication devices comprises an access-time-related information, wherein the access-time-related information defines at least one predefined point in time or at least one predefined time interval at which or during which the considered machine type communication device is allowed to access the mobile communication network, wherein a data transmission event between, on the one hand, the mobile communication network, and, on the other hand, the machine type communication devices of the group of machine type communication devices, occurs at the predefined points in time or during the predefined time intervals.

8. A mobile communication network for enhanced machine type communication with a group of machine type communication devices, wherein a plurality of subscribers are related to the mobile communication network, the mobile communication network comprising:
at least one network node configured to provide a Home Location Register functionality and/or a Home Subscriber Server functionality for the plurality of subscribers,
wherein a subscriber identifier is related to each of the plurality of subscribers of the mobile communication network such that the identifier content of the subscriber identifier is different for different subscribers related to the mobile communication network,
wherein the group of machine type communication devices is related to the same subscriber related to the mobile communication network, and
wherein the group of machine type communication devices comprises a maximum number of machine type communication devices, the maximum number of machine type communication devices being dependent on the predefined access duration and the predefined access frequency of the group of machine type communication devices such that, in case that a machine type communication device of the group of machine type communication devices accesses the mobile communication network, the likelihood of a collision with another machine type communication device of the same group of machine type communication devices also accessing the mobile communication network is equal to or lower than 10%.

9. The mobile communication network according to claim 8, wherein the subscriber identifier corresponds to an International Mobile Subscriber Identity number (IMSI number) or wherein the subscriber identifier corresponds to a Mobile Subscriber Integrated Services Digital Network Number (MSISDN number) or wherein the subscriber identifier corresponds to a combination of the International Mobile Subscriber Identity number (IMSI number) and the Mobile Subscriber Integrated Services Digital Network Number (MSISDN number), and
wherein each machine type communication device of the group of machine type communication devices:
comprises an identity module, or an embedded identity module, or a soft subscriber identity module (soft SIM), having an identity module identifier, and/or
is related to an integrated circuit card identifier, and/or
comprises a serial number, and/or
is related to an identifier in the application running on the machine type communication device,
such that, by transmitting the identity module identifier and/or transmitting the integrated circuit card identifier and/or transmitting the serial number, the transmitting machine type communication device of the group of machine type communication devices is able to be individually identified among the machine type communication devices of the group of machine type communication devices, especially by means of an International Mobile Equipment Identity (IMEI) and/or by means of an Integrated Circuit Card Identity (IC-CID) and/or by means of the identifier in the application running on the machine type device.

10. A machine type communication device of a group of machine type communication devices for enhanced machine type communication between a mobile communication network, on the one hand, and the group of machine type communication devices, on the other hand, wherein a plurality of subscribers are related to the mobile communication network, wherein at least one network node of the mobile communication network provides a Home Location Register functionality and/or a Home Subscriber Server functionality for the plurality of subscribers, wherein a subscriber identifier is related to each of the plurality of subscribers of the mobile communication network such that the identifier content of the subscriber identifier is different for different subscribers related to the mobile communication network, wherein the group of machine type communication devices is related to the same subscriber related to the mobile communication network, wherein the group of machine type communication devices comprises a maximum number of machine type communication devices, the maximum number of machine type communication devices being dependent on the predefined access duration and the predefined access frequency of the group of machine type communication devices such that, in case that a machine type communication device of the group of machine type communication devices accesses the mobile communication network, a likelihood of a collision with another machine type communication device of the same group of machine type communication devices also accessing the mobile communication network is equal to or lower than 10%.

11. The machine type communication device according to claim 10, wherein the subscriber identifier corresponds to the International Mobile Subscriber Identity number (IMSI number) or wherein the subscriber identifier corresponds to the Mobile Subscriber Integrated Services Digital Network Number (MSISDN number) or wherein the subscriber identifier corresponds to a combination of the International Mobile Subscriber Identity number (IMSI number) and the Mobile Subscriber Integrated Services Digital Network Number (MSISDN number), wherein each machine type communication device of the group of machine type communication devices:

comprises an identity module, or an embedded identity module, or a soft subscriber identity module (soft SIM), having an identity module identifier, and/or is related to an integrated circuit card identifier, and/or comprises a serial number, and/or is related to an identifier in the application running on the machine type communication device such that, by transmitting the identity module identifier and/or transmitting the integrated circuit card identifier and/or transmitting the serial number, the transmitting machine type communication device of the group of machine type communication devices is able to be individually identified among the machine type communication devices of the group of machine type communication devices, especially by an International Mobile Equipment Identity (IMEI) and/or by an Integrated Circuit Card Identity (ICCID) and/or by the identifier in the application running on the machine type device.

12. A user equipment for communication between a mobile communication network, on the one hand, and a group of user equipments, on the other hand, wherein the user equipment is configured to be operated in a first mode of operation and in a second mode of operation, wherein the second mode of operation corresponds to the use of the user equipment as a machine type communication device, wherein a plurality of subscribers are related to the mobile communication network, wherein at least one network node of the mobile communication network provides a Home Location Register functionality and/or a Home Subscriber Server functionality for the plurality of subscribers, wherein a subscriber identifier is related to each of the plurality of subscribers of the mobile communication network such that the identifier content of the subscriber identifier is different for different subscribers related to the mobile communication network, wherein the group of machine type communication devices is related to the same subscriber related to the mobile communication network, and wherein the user equipment in its first mode of operation corresponds to a different subscriber of the plurality of subscribers related to the mobile communication network, wherein the group of machine type communication devices comprises a maximum number of machine type communication devices, the maximum number of machine type communication devices being dependent on the predefined access duration and the predefined access frequency of the group of machine type communication devices such that, in case that a machine type communication device of the group of machine type communication devices accesses the mobile communication network, a likelihood of a collision with another machine type communication device of the same group of machine type communication devices also accessing the mobile communication network is equal to or lower than 10%.

13. A non-transitory computer-readable medium comprising a computer readable program code which, when executed on a computer or on machine type communication device of the group of machine type communication devices or on a network component of a mobile communication network, causes the computer or the machine type communication device or the network component of the mobile communication network to perform a method according claim 1.

14. A non-transitory computer-readable medium having a computer program product stored thereon for enhanced machine type communication between a mobile communication network, on the one hand, and a group of machine type communication devices, on the other hand, the computer program product comprising:

a computer program, the computer program comprising program code which, when executed on a computer or on machine type communication device of the group of machine type communication devices or on a network component of the mobile communication network, causes the computer or the machine type communication device or the network component of the mobile communication network to perform a method according to claim 1.

* * * * *